United States Patent
Halepete et al.

(10) Patent No.: US 7,100,061 B2
(45) Date of Patent: Aug. 29, 2006

(54) ADAPTIVE POWER CONTROL

(75) Inventors: Sameer Halepete, San Jose, CA (US); H. Peter Anvin, San Jose, CA (US); Zongjian Chen, Palo Alto, CA (US); Godfrey P. D'Souza, San Jose, CA (US); Marc Fleischmann, Menlo Park, CA (US); Keith Klayman, Sunnyvale, CA (US); Thomas Lawrence, Mountain View, CA (US); Andrew Read, Sunnyvale, CA (US)

(73) Assignee: Transmeta Corporation, Santa Clara, CA (US)

( * ) Notice: Subject to any disclaimer, the term of this patent is extended or adjusted under 35 U.S.C. 154(b) by 90 days.

(21) Appl. No.: 09/484,516

(22) Filed: Jan. 18, 2000

(65) Prior Publication Data

US 2002/0116650 A1 Aug. 22, 2002

(51) Int. Cl.
*G06F 1/30* (2006.01)
(52) U.S. Cl. .................................................... 713/322
(58) Field of Classification Search ......... 713/300–340
See application file for complete search history.

(56) References Cited

U.S. PATENT DOCUMENTS

| | | | |
|---|---|---|---|
| 5,086,501 A | 2/1992 | DeLuca et al. ............. | 395/550 |
| 5,167,024 A | 11/1992 | Smith et al. ................ | 395/375 |
| 5,201,059 A | 4/1993 | Nguyen ...................... | 395/800 |
| 5,204,863 A | 4/1993 | Saint-Joigny et al. ...... | 371/16.3 |
| 5,218,704 A | 6/1993 | Watts, Jr. et al. ........... | 395/750 |
| 5,222,239 A | 6/1993 | Rosch ........................ | 395/750 |
| 5,230,055 A | 7/1993 | Katz et al. .................. | 395/750 |
| 5,239,652 A | 8/1993 | Seibert et al. .............. | 395/750 |
| 5,422,806 A | 6/1995 | Chen et al. ................. | 364/149 |
| 5,461,266 A | 10/1995 | Koreeda et al. ............ | 307/125 |
| 5,502,838 A | 3/1996 | Kikinis ....................... | 395/550 |
| 5,511,203 A | 4/1996 | Wisor et al. ................ | 395/750 |
| 5,560,020 A | 9/1996 | Nakatani et al. ............ | 395/750 |
| 5,572,719 A * | 11/1996 | Biesterfeldt ................. | 713/500 |
| 5,592,173 A | 1/1997 | Lau et al. .................... | 342/357 |
| 5,628,001 A * | 5/1997 | Cepuran ...................... | 713/501 |
| 5,630,110 A * | 5/1997 | Mote, Jr. ..................... | 713/501 |
| 5,682,093 A | 10/1997 | Kivela ......................... | 323/273 |
| 5,687,114 A * | 11/1997 | Khan ..................... | 365/185.03 |
| 5,692,204 A | 11/1997 | Rawson et al. ............. | 395/750 |
| 5,710,929 A * | 1/1998 | Fung ........................... | 713/322 |
| 5,713,030 A * | 1/1998 | Evoy ........................... | 713/322 |
| 5,717,319 A | 2/1998 | Jokinen ....................... | 323/280 |
| 5,719,800 A | 2/1998 | Mittal et al. ................. | 364/707 |
| 5,726,901 A * | 3/1998 | Brown | |
| 5,745,375 A * | 4/1998 | Reinhardt et al. ........... | 700/286 |
| 5,752,011 A | 5/1998 | Thomas et al. ............. | 395/556 |

(Continued)

FOREIGN PATENT DOCUMENTS

EP     0381021 A2    8/1990

(Continued)

OTHER PUBLICATIONS

Andrew S. Tanenbaum, Structured Computer Organization, 1990, Prentice-Hall, Third edition, pp. 11-13.*

(Continued)

*Primary Examiner*—Paul R. Myers

(57) ABSTRACT

A method for controlling the power used by a computer including the steps of measuring the operating characteristics of a central processor of the computer, determining when the operating characteristics of the central processor are significantly different than required by the operations being conducted, and changing the operating characteristics of the central processor to a level commensurate with the operations being conducted.

59 Claims, 4 Drawing Sheets

U.S. PATENT DOCUMENTS

| | | | | |
|---|---|---|---|---|
| 5,754,869 | A | | 5/1998 | Holzhammer et al. . 395/750.01 |
| 5,757,171 | A | | 5/1998 | Babcock ..................... 323/271 |
| 5,774,703 | A | * | 6/1998 | Weiss et al. ................ 713/501 |
| 5,778,237 | A | | 7/1998 | Yamamoto et al. .... 395/750.04 |
| 5,781,783 | A | * | 7/1998 | Gunther et al. ............. 713/320 |
| 5,812,860 | A | * | 9/1998 | Horden et al. .............. 713/322 |
| 5,815,724 | A | | 9/1998 | Mates .................... 395/750.04 |
| 5,825,674 | A | | 10/1998 | Jackson ....................... 364/707 |
| 5,832,205 | A | * | 11/1998 | Kelly et al. .................... 714/53 |
| 5,832,284 | A | * | 11/1998 | Michail et al. ............. 713/322 |
| 5,848,281 | A | | 12/1998 | Smalley et al. ........ 395/750.04 |
| 5,884,049 | A | | 3/1999 | Atkinson .................... 395/281 |
| 5,894,577 | A | | 4/1999 | MacDonald et al. ........ 395/733 |
| 5,913,067 | A | * | 6/1999 | Klein .......................... 713/300 |
| 5,914,996 | A | * | 6/1999 | Huang ........................ 327/115 |
| 5,919,262 | A | | 7/1999 | Kikinis et al. .............. 713/300 |
| 5,923,545 | A | | 7/1999 | Nguyen ....................... 363/24 |
| 5,933,649 | A | | 8/1999 | Lim et al. .............. 395/750.04 |
| 5,940,785 | A | * | 8/1999 | Georgiou et al. ........... 713/322 |
| 5,940,786 | A | | 8/1999 | Steeby ....................... 702/132 |
| 5,974,557 | A | | 10/1999 | Thomas et al. ............. 713/322 |
| 5,996,083 | A | | 11/1999 | Gupta et al. ................ 713/322 |
| 5,996,084 | A | | 11/1999 | Watts ......................... 713/323 |
| 6,021,500 | A | * | 2/2000 | Wang et al. ................ 713/320 |
| 6,047,248 | A | | 4/2000 | Georgiou et al. ........... 702/132 |
| 6,078,319 | A | | 6/2000 | Bril et al. ................... 345/211 |
| 6,094,367 | A | * | 7/2000 | Hsu et al. ..................... 363/78 |
| 6,112,164 | A | * | 8/2000 | Hobson ...................... 702/132 |
| 6,118,306 | A | | 9/2000 | Orton et al. .................. 327/44 |
| 6,119,241 | A | | 9/2000 | Michail et al. ............. 713/322 |
| 6,141,762 | A | | 10/2000 | Nicol et al. ................. 713/300 |
| 6,157,092 | A | | 12/2000 | Hofmann ..................... 307/11 |
| 6,202,104 | B1 | | 3/2001 | Ober ........................... 710/18 |
| 6,216,235 | B1 | | 4/2001 | Thomas et al. ............. 713/501 |
| 6,272,642 | B1 | | 8/2001 | Pole, III et al. ............ 713/300 |
| 6,279,048 | B1 | | 8/2001 | Fadavi-Ardekani et al. .. 710/15 |
| 6,304,824 | B1 | | 10/2001 | Bausch et al. ................ 702/64 |
| 6,311,287 | B1 | | 10/2001 | Dischler et al. ............ 713/601 |
| 6,314,522 | B1 | | 11/2001 | Chu et al. ................... 713/322 |
| 6,345,363 | B1 | | 2/2002 | Levy-Kendler ............. 713/320 |
| 6,347,379 | B1 | | 2/2002 | Dai et al. .................... 713/320 |
| 6,378,081 | B1 | | 4/2002 | Hammond .................. 713/501 |
| 6,388,432 | B1 | | 5/2002 | Uchida ....................... 323/266 |
| 6,415,388 | B1 | | 7/2002 | Browning et al. .......... 713/322 |
| 6,425,086 | B1 | | 7/2002 | Clark et al. ................. 713/322 |
| 6,427,211 | B1 | | 7/2002 | Watts, Jr. .................... 713/320 |
| 6,442,746 | B1 | | 8/2002 | James et al. .................. 716/14 |
| 6,457,135 | B1 | | 9/2002 | Cooper ....................... 713/323 |
| 6,477,654 | B1 | | 11/2002 | Dean et al. ................. 713/300 |
| 6,487,668 | B1 | | 11/2002 | Thomas et al. ............. 713/322 |
| 6,510,400 | B1 | | 1/2003 | Moriyama .................. 702/132 |
| 6,510,525 | B1 | | 1/2003 | Nookala et al. ............ 713/324 |
| 6,513,124 | B1 | | 1/2003 | Furuichi et al. ............ 713/322 |
| 6,519,706 | B1 | | 2/2003 | Ogoro ........................ 713/322 |
| 6,574,739 | B1 | | 6/2003 | Kung et al. ................. 713/322 |
| 2002/0026597 | A1 | | 2/2002 | Dai et al. .................... 713/322 |
| 2002/0073348 | A1 | | 6/2002 | Tani ........................... 713/300 |
| 2002/0083356 | A1 | | 6/2002 | Dai ............................. 713/322 |
| 2002/0138778 | A1 | | 9/2002 | Cole et al. .................. 713/330 |
| 2003/0065960 | A1 | | 4/2003 | Rusu et al. .................. 713/300 |
| 2003/0074591 | A1 | | 4/2003 | McClendon et al. ........ 713/322 |

FOREIGN PATENT DOCUMENTS

| | | |
|---|---|---|
| EP | 474963 A2 | 3/1992 |
| EP | 0501655 A2 | 9/1992 |
| JP | 409185589 A | 7/1997 |
| WO | WO0127728 | 4/1901 |

OTHER PUBLICATIONS

Weiser et al.; "Scheduling for Reduced CPU Energy"; Xerox PARC; Palo Alto, CA; Appears in "Proceedings of the First Syymposium on Operating Systems Design and Implementation" USENIX Association; Nov. 1994.

Govil;"Comparing Algorithms for Dynamic Speed-Setting of a Low-Power CPU"; International Computer Science Institute; Berkeley, CA; Apr. 1995.

Desai et al.; "Sizing of Clock Distribution Networks for High Performance CPU Chips"; Digital Equipment Corp., Hudson, MA; pp. 389-394; 1996.

"High-Speed, Digitally Adustedstepdown Controllers for Notebook CPUS"; Maxim Manual; pp. 11 & 21.

"Operatio U (Refer to Functional Diagram)"; LTC 1736;, Linear Technology Manual; p. 9.

Intel Corporation; "Intel 82801 CAM I/O Controller HUB (ICH3-M)" Datasheet; Jul. 2001.

\* cited by examiner

ADAPTIVE POWER CONTROL

BACKGROUND OF THE INVENTION

1. Field of the Invention

This invention relates to computer systems and, more particularly, to methods for varying the amount of power used by such systems during use of the systems.

2. History of the Prior Art

A significant problem faced by battery powered computers is the length of time such computers are capable of operating between charges. As computer processors become more capable, they tend to run at faster speeds and dissipate more power. At the same time, the size and weight of portable computers is constantly being reduced to make them more portable. Since batteries tend to be a very significant element of the weight of portable computers and other portable devices, the tendency has been to maintain their size and thus their capacity at a minimum.

A typical portable computer today has an average life of approximately two and one-half hours until its originally-full battery must be recharged.

A great deal of research has been directed to ways for extending the operating life of portable computers. Presently, typical processors include circuitry and software for disabling various power-draining functions of portable computers when those functions are unused for some extensive period. For example, various techniques have been devised for turning off the screen when it has not been used for some selected period. Similar processes measure the length of time between use of hard drives and disable rotation after some period. Another of these processes is adapted to put a central processor into a quiescent condition after some period of inactivity.

In general, these processes are useful in extending the operating life of a portable computer. However, the life still does not extend significantly beyond two and one-half hours for any computer having significant capabilities.

There has been a significant amount of research conducted from which processor requiring less power might be produced. Most processors used in computer systems today are made using CMOS technology. The power consumed by a CMOS integrated circuit is given approximately by $P=CV^2f$, where C is the active switching capacitance, V is the supply voltage, and f is the frequency of operation. The maximum allowable frequency is described by $f_{max}=kV$, where k is a constant.

It is desirable to operate the processor at the lowest possible voltage at a frequency that provides the computing power desired by the user at any given moment. For instance, if the processor is operating at 600 MHz, and the user suddenly runs a compute-intensive process half as demanding, the frequency can be dropped by a factor of two. This means that the voltage can also be dropped by a factor of two. Therefore, power consumption is reduced by a factor of eight. Various methods of implementing this dynamic voltage-frequency scaling have been described in the prior art. All of these involve a component separate from the processor on the system that provides multiple frequencies to multiple system components. Also, they involve state-machines or power-management units on the system to coordinate the voltage-frequency changes. The efficiency of voltage frequency scaling is reduced when the frequency generator is not on the processor. Having a separate power-management unit increases the number of components in the system and the power dissipated by the system. It is also desirable to have the processor control both the voltage it receives and the frequency it receives. As the level of integration increases in processors, they control most of the system clocks; and it is desirable to provide control to the processor to change these clocks so they can be run at just the right frequency. Having a separate clock generator that produces multiple frequencies is not desirable because of the lack of tight coupling.

It is desirable to increase significantly the operating life of portable computers and similar devices.

SUMMARY OF THE INVENTION

It is, therefore, an object of the present invention to increase significantly the operating life of portable computers.

This and other objects of the present invention are realized by a method for controlling the power used by a computer including the steps of utilizing control software to measure the operating characteristics of a processor of the computer, determining when the operating characteristics of the central processor are significantly different than required by the operations being conducted, and changing the operating characteristics of the central processor to a level commensurate with the operations being conducted.

These and other objects and features of the invention will be better understood by reference to the detailed description which follows taken together with the drawings in which like elements are referred to by like designations throughout the several views.

DETAILED DESCRIPTION

Figure 1:
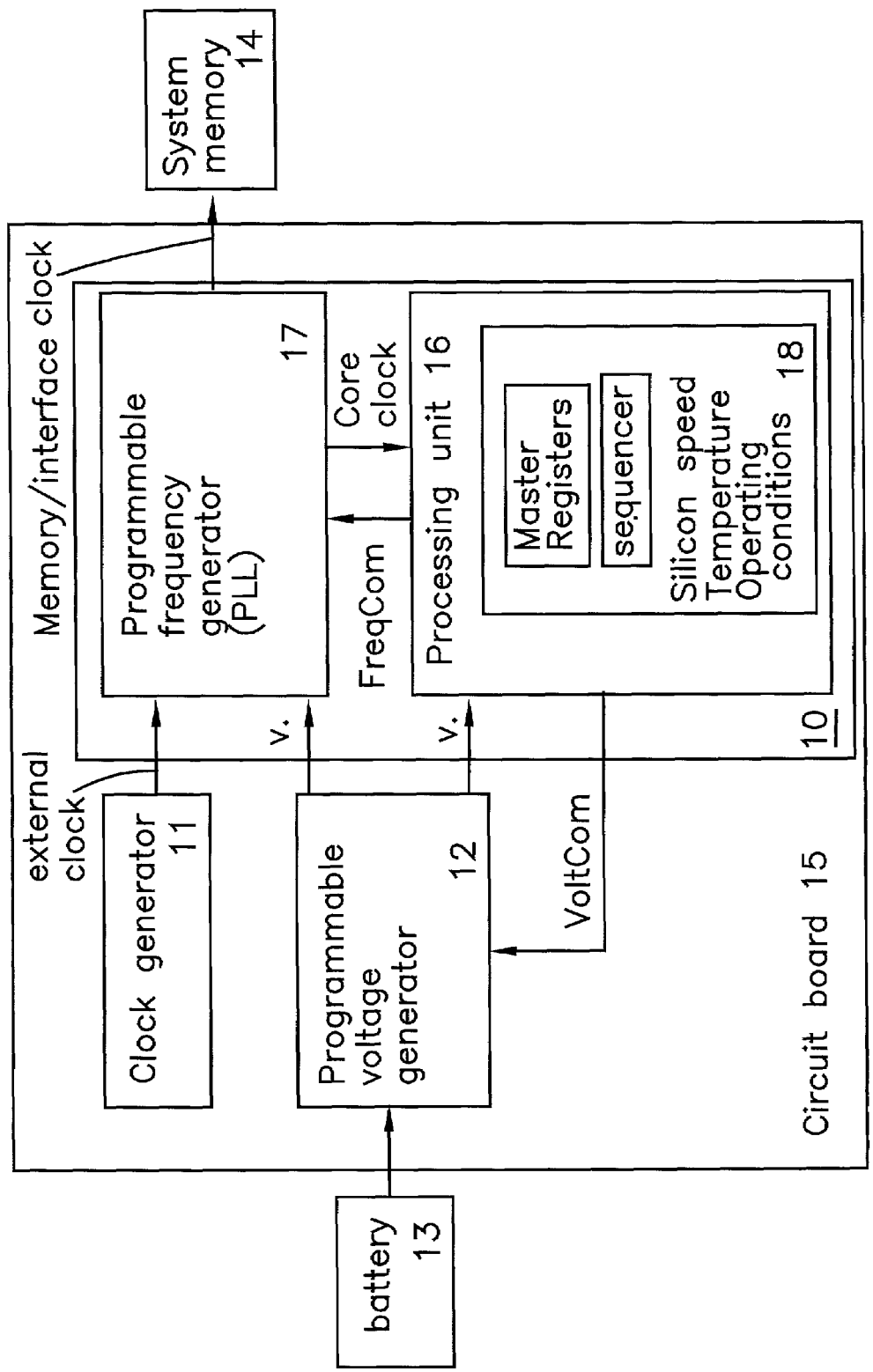
FIG. 1 is a block diagram of various hardware components of a computer system utilized in accordance with the present invention.

FIG. 1 is a block diagram of various hardware components of a computer system utilized in accordance with the present invention to control the operating frequency and voltage of the system. The hardware includes a processor 10, a clock generator 11, a programmable voltage generator 12, system memory (DRAM) 14, and an external battery (or other power supply) 13. The processor 10, clock generator 11, and voltage generator 12 are all mounted to a circuit board 15 in a manner known to those skilled in the art. The battery 13 and system memory 14 may be electrically connected to the circuit board in a number of possible ways known to those skilled in the art.

The processor 10 includes on the same semiconductor chip a number of components including a processing unit 16 and a programmable frequency generator 17. The processor 10 also typically includes a number of other components which are known to those skilled in the art but are not pertinent to the present invention and are therefore not illustrated. The processing unit 16 includes a number of logical components including a master control unit 18 which is the central portion for accomplishing clock and voltage control. In the present invention, the master control unit 18 also includes circuitry for monitoring the operating characteristics of the processor. Various monitoring functions (such as circuitry for accomplishing voltage and frequency monitoring) which are well known to the prior art are included as a part of the logical master control unit 18. The logical unit 18 may also include circuitry for making available additional information detected by other portions of the computer system in either analogue or digital form (e.g., temperature data). The logical unit 18 also includes circuitry for detecting other operations of the system including commands to be executed from which a particular type of operation to be executed may be determined. A detailed discussion of circuitry for providing various operating characteristics is included in U.S. patent application Ser. No. 09/417,930, entitled *Programmable Event Counter System*, B. Coon et al, filed Oct. 13, 1999, and assigned to the assignee of the present application.

The programmable frequency generator 17 receives an external frequency often referred to as a "slow clock" from the external clock generator 11. The generator 17 responds to values furnished by control software executing on the processor to produce from the slow clock a core clock for operation of the processing unit 16, one or more clocks for operation of the various system memory components shown as system memory 14 in the figure, the system bus, and any other components which might utilized a separate clock.

It should be specifically noted that contrasted to prior art systems, the programmable frequency generator is able to provide individual frequencies selectable for each of these components. Thus, prior art arrangements utilize an external clock generator to provide all of the different frequencies utilized by the system. This has a number of effects which are less than desirable. Since the clocks are generated off-chip, the time needed to change frequency is long. Since in an integrated processor all clocks are created from a single slow clock off chip, if the core frequency changes all of the frequencies change with it. Thus, a frequency furnished a single component cannot be changed without affecting a change in other frequencies. The voltage furnished by the external clock generator does not change even though reduced frequencies adapted to provide reduced levels of operations are furnished for various components of the system. A number of other factors slow the response of the system to changes in the various clocks when an external clock is used to generate the various operating frequencies for a system.

The core frequency for the processing unit 16 is generated by multiplying the slow clock by a factor. This factor is computed by the control software of the present invention which monitors the operation of the processor to determine from the characteristics of the processor just what frequency should be selected. The manner in which the monitoring is accomplished and the effect it has on the control of the operating characteristics is described in detail below.

The frequencies at which the other components of the system operate are determined from the core frequency determined by multiplying the slow clock by the core processor factor. For example, a system input/output (I/O) bus typically functions at a much slower frequency than does the processing unit. In the present invention, the control software computes the bus frequency by dividing the core frequency by a value. The process may also be conducted as a table lookup of an already computed value. If the processing unit is conducting its current operations at a normal speed of 400 MHz, a bus frequency of 100 MHz is derived by dividing the core clock by four. On the other hand, if the processing unit is capable of accomplishing its current operations at a relatively slow speed of 200 MHz, a bus frequency of 100 MHz. is still desirable since bus operations are often the limiting factor in processing operations. In such a case, the control software computes a value of two as the divisor to obtain the bus frequency. It should be noted that although the bus frequency under discussion has been the system I/O bus, the invention may also be used for precisely choosing the operating frequencies for other system buses.

Similarly, various processors are often capable of utilizing system memory having different characteristics one of which is switching speed.

A system may utilize a plurality of interfaces between the processing unit and system memory in order to provide different operating frequencies for system memory which is being utilized. The present invention allows this to be easily accomplished by utilizing different divisors to obtain different values from which the operating frequencies for different system memory units are determined. As will be noted in the following discussion, two different memory frequencies as utilized and more are possible.

Thus, by utilizing the phase-lock-loop generator 17 to determine a core clock frequency and dividing that frequency by a plurality of different values determined by the control software, the operating frequencies for the different components of the system may be individually controlled and furnished to other components of the processor without the necessity of crossing chip boundaries with the consequent slowing caused by negotiating the boundaries.

Figure 3:
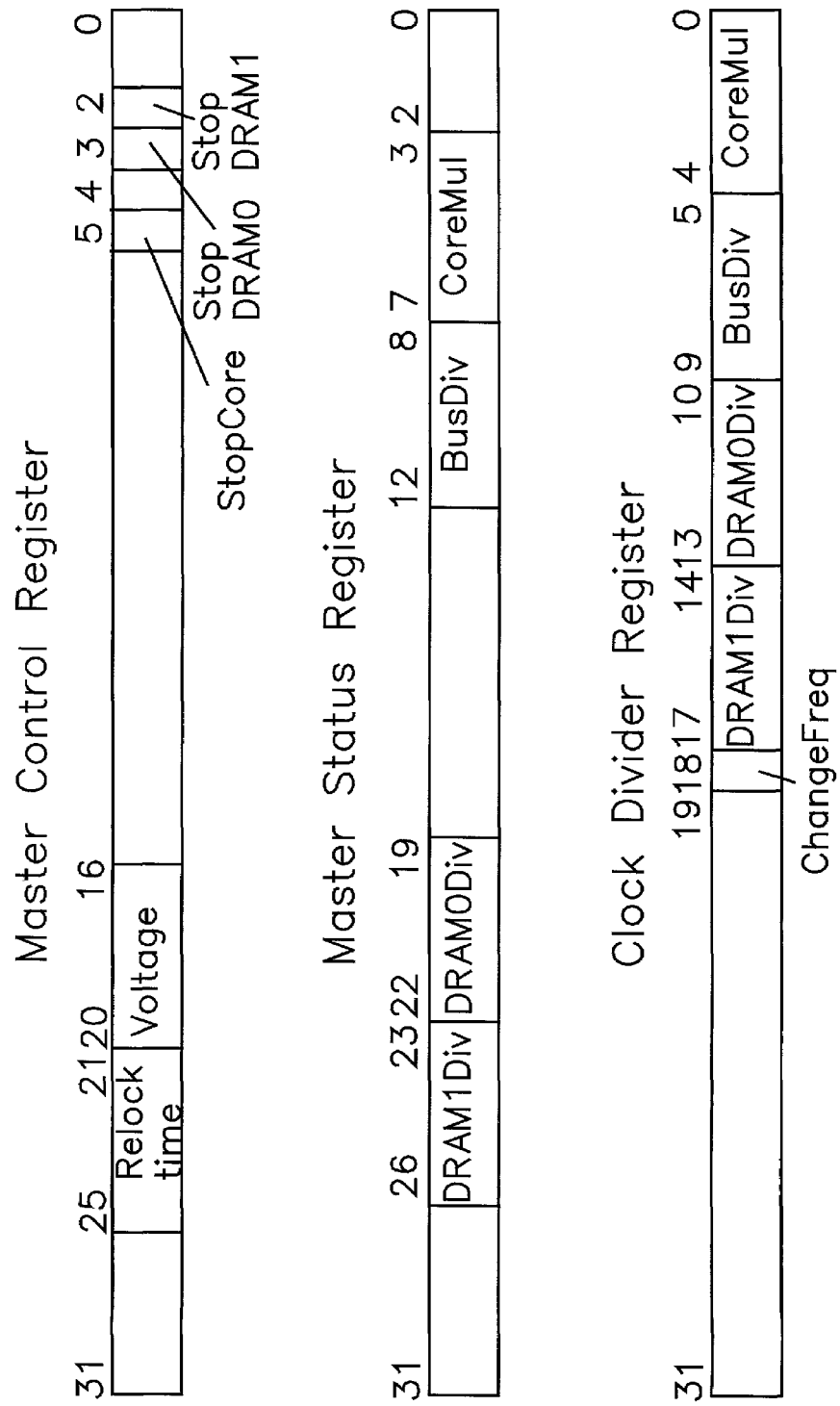
FIG. 3 illustrates a number of registers utilized in the hardware components of the system shown in FIG. 1.

In order to allow the master control unit 18 to accomplish these operations, the processing unit 16 includes a number of registers which are utilized by the control software and the hardware. These include a master control register 20, a master status register 21, and a master clock divider register 22 which are illustrated in FIG. 3.

Of these registers, the clock divider register 22 stores, among other things, the multiplier computed by the control software for generating the core frequency, the value used as a divisor to obtain the bus frequency from the core frequency, a value used as a divisor to obtain a first system memory frequency from the core frequency, and a value used as a divisor to obtain a second system memory frequency from the core frequency. In addition, the clock divider register 22 stores values used for various other including an indication that a frequency change command has been received.

The master control register includes values pertinent to the present description including the voltage which is to be furnished to the processor as a part of the change of frequency. This register also stores a value indicating the time period allowed for accomplishing the phase-lock-loop relock operation. The master status register also stores the various values used as dividers and the value used as a multiplier to obtain the core frequency along with other significant information.

Figure 4:
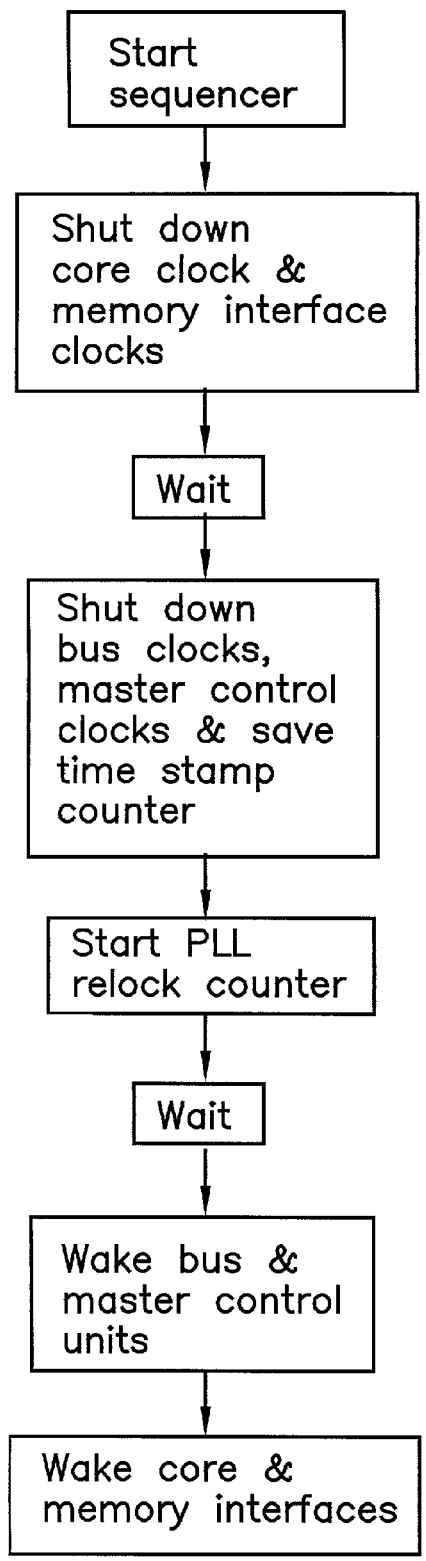
FIG. 4 is a block diagram illustrating the operation of sequencer circuitry which is a part of a processor illustrated in the system of FIG. 1.

The various values stored in these registers are utilized, among other things, to control the operations of sequencer circuitry (illustrated in FIG. 4) which carries out the operations necessary to changing the frequency at which the components of the system operate. The sequencer circuitry carries out the series of steps required by which the phase-lock-loop circuitry is brought to the new frequency and relocked after the processor clock has been shut off.

The operations carried out by the sequencer commence at an idle state which represents the normal condition of the sequencer in the absence of a frequency change operation. When the change frequency command and values are received, the sequencer steps from the idle condition to first shut down the core clock and the clocks to the various memory interfaces. The sequencer then waits a few cycles before shutting down the bus clock, the master control clock, and saving information sufficient to assure that timing during and after the sequencing is correct. After this delay, the sequencer starts a counter to time the phase-lock-loop relock process. When this count is complete, the sequencer wakes the bus and the master control units. Finally, the sequencer wakes up the core and memory interfaces and awaits another frequency changing operation. The relation of the sequencer to the control software will be described in detail in the discussion of the process of the control software which follows.

Figure 2:
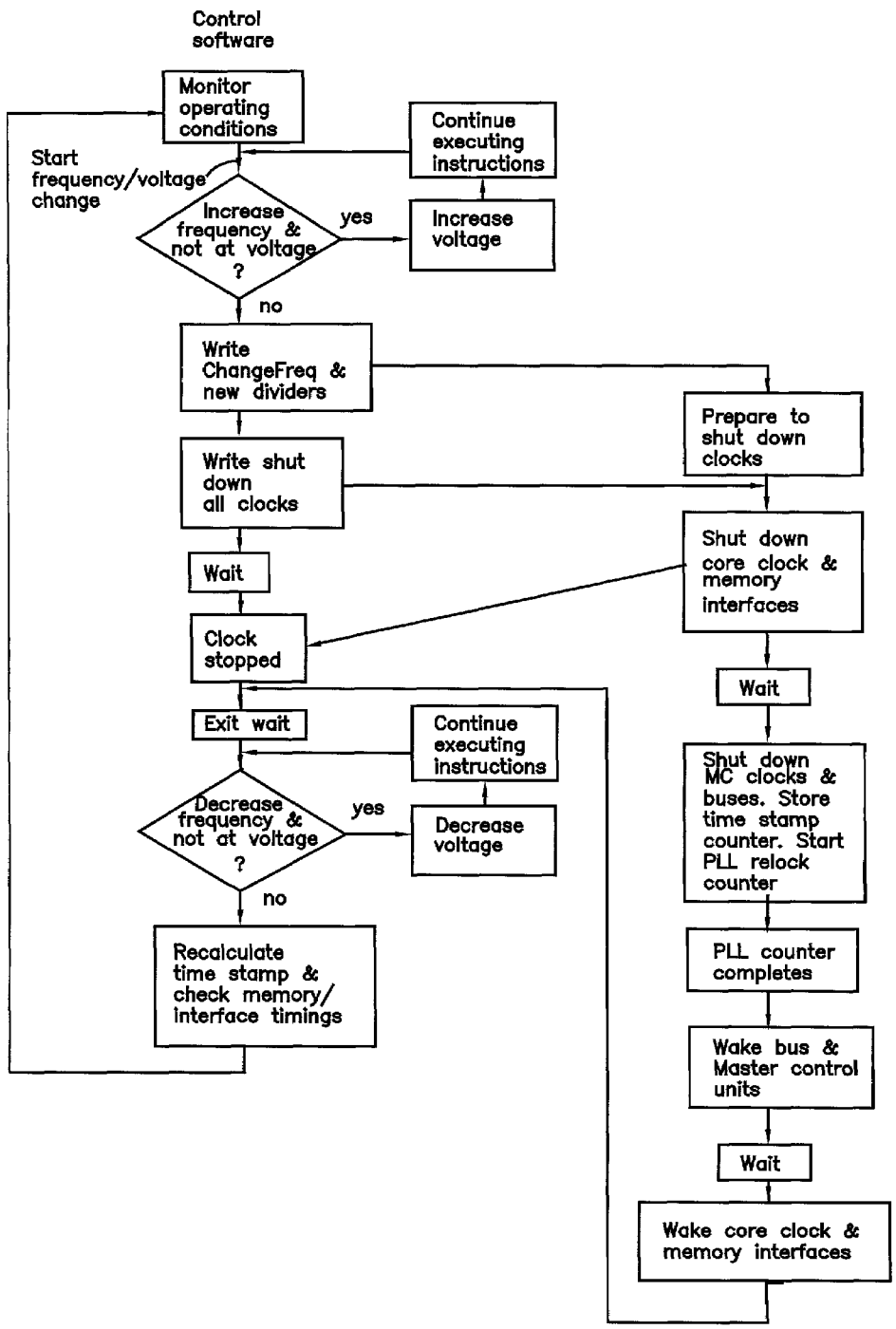
FIG. 2 is a flow chart illustrating the operation of one embodiment of the invention.

FIG. 2 is a flow chart representing the process carried out by one embodiment of the invention. In the figure, the steps described in the left column represent operations accomplished by the control software, while the steps described in the right column represent operations accomplished by the cooperating hardware.

In a first step, the control software monitors various conditions of the processor which relate to power expenditure by the processor. These conditions may include any of those described above including the present frequency and voltage of operation, the temperature of operation, the amount of time the processor spends in one of what may be a number of idle states in which various components of the system are quiescent. For example, if the processor is running in what might be termed its normal mode of operation at a core frequency of 400 MHz. and a voltage of 1.3 volts, the control software may be monitoring the amount of time the processor spends in the "halt" state, the amount of time the processor spends in the "deep sleep" state, and the temperature of the processor. The deep sleep state is a state in which power is furnished only to the processor and to DRAM memory. In this state, the processor are all off and it does not respond to any interrupts. The halt state is a state in which the core clock has been stopped but the processor responds to most interrupts. If the processor is spending more than a preselected increment of its operation in these states while operating at normal frequency and voltage, then power is being wasted. The detection of such operating characteristics therefore may indicate that the frequency and voltage of operation should be reduced.

On the other hand, it may be found that the processor is functioning at a reduced frequency and voltage and that a series commands have been furnished to be executed by the processor which require greater processing power. In such a case, these characteristics suggest that it may be desirable to increase the voltage and frequency of operation in order to handle these commands.

Consequently, the control software detects operating characteristics and determines whether those characteristics indicate that the frequency and voltage of operation should be changed. From the possible sets of conditions, the control software detects the particular set involved and computes correct values for the core clock frequency, the core clock frequency multiplier, the various DRAM clock frequency dividers, and the bus frequency divider. If any other components of the circuitry receive their own clocks, then multipliers or dividers for these values are computed. It should be noted that the control software may actually compute the various values required for the given characteristics which have been determined or may utilize a lookup table storing precomputed values.

At a next step, the software reviews the values computed and determines whether the frequency is to be increased. If the frequency is to be increased, it is first necessary that the voltage be increased to allow the processor to function at a higher frequency. In such a case, it is first necessary to increase the voltage level of operation. The typical power supplies offer a number of pins (often five) by which different operating voltages may be selected. This allows a range of different voltages to be provided. Consequently, the control software simply furnishes a correct value on the input pins of the power supply to cause the computed voltage to be furnished to the frequency generator and to the processor. In one embodiment, the voltage increase is accomplished by providing a level to be reached and a time period for the voltage to settle to this level.

It should be noted that the voltage may be increased in a single step, an action which would typically cause phase-locked-loop circuitry of a frequency generator to lose its lock and would create a large surge of current causing the currently-available voltage regulator circuitry to initiate a system reset. This problem may be eliminated with future voltage regulator circuitry. Alternatively, the voltage may be increased in a series of small steps which would not have this effect. For example, if increases of approximately 50 millivolts are enabled, then the frequency generator will remain stable during the voltage increase and a system reset will not occur. This offers the advantage that the processor may continue to execute commands during the period in which the voltage change is taking place.

If the control software was not increasing but rather decreasing frequency of operation at the previous step, then the original voltage level is not changed at this time. In either case, the control software then goes through a sequence of steps in which various operations of the processor are prepared for shutdown so that the system clocks can be changed. With a particular processor such as that referred to in the patent application described above, this includes flushing a gated store buffer, suspending bus and direct memory access (DMA) operations, and enabling self-refreshing circuitry for system DRAM memory.

With these processor operations shut down, the control software transfers the new divider values and writes a bit indicating a frequency change is to occur. The hardware stores the divider values in the clock divider register and the change frequency indicator. This starts the hardware process of the sequencer. The control software then writes "stop core," "stop DRAM0" and "stop DRAM1" bits of the master command register to stop the clocks being furnished to these components.

Writing the master control register bits to stop the clock frequencies and the values to the hardware causes the hardware to commence the remainder of the frequency changing operation utilizing the sequencer circuitry described above. At this point, the software effectively goes into a wait state which continues until the core clock is enabled at the new frequency. The sequencer responds to the command by shutting down the core clock and the DRAM memory interfaces. The sequencer pauses for sufficient time to assure that this has happened and then shuts down the bus and master control clocks.

Because the core clock has been stopped, timing must be accomplished based on the external clock furnished to the system during this period. Counter circuitry dependent only on phase-lock-loop relock time is utilized to measure the time allowed for the phase-lock-loop circuitry to lock to the new frequency. At this point, the sequencer utilizes the new values furnished to effect a new value for the core (and other) frequency. After a safe lock period has passed ("relock time" stored in the master control register), the sequencer wakes the bus and master control units. The sequencer waits a few clocks of the slow frequency and then turns on the core clock and the DRAM interfaces.

Because the internal clocks of the system are shut down during the operation of the sequencer, it is necessary that the system provide a means of maintaining timing consistent with the normal world clock. Computer systems utilize a time stamp counter to keep track of world clock values. The value kept in this counter is utilized for certain operations conducted by the central processing unit. Once the phase-lock-loop circuitry of the frequency generator 17 has been stopped, the value in the time clock counter no longer represents accurate world time. Moreover, when the new frequency is reached and locks in, the rate at which the counter is iterated will change. To provide for accurate time stamp readings, a number of lower-valued bits indicating the last time of program execution held by the time stamp counter are stored. These are furnished to the control software along with the relock time value and the new frequency once the frequencies have restabilized to allow accurate computation of the normal world time.

Once the clocks have been turned on at the new frequencies, the control software ends its wait state and determines whether the operation was to decrease the frequency. Assuming the operation was to increase the frequency, the software then recalculates the time stamp counter value and checks the various interface timings to assure that they are correct. If the operation was to decrease the frequency, the control software causes the voltage to be lowered to the calculated value (either in one or a series of incremental steps) and then recalculates the value for the time stamp counter and checks the interface timings. At that point, the control software begins again to monitor the various conditions controlling the frequency and voltage of operation.

It should be noted that at some point during the monitoring operation it may be found that the processor is functioning at a normal frequency and voltage, that the temperature of operation is below some preselected value, and that a series of processor-intensive commands have been furnished to be executed by the processor. In such a case, these characteristics suggest that it may be desirable to increase the voltage and frequency of operation in order to handle these commands for a period less than would raise operating temperatures beyond a safe level. In such a case, the control software may compute higher frequency and voltage values and a temperature (or a time within which temperature will not increase beyond a selected level) in order to cause the hardware to move to this higher frequency state of operation. In such a case, the processor executing the process illustrated effectively ramps up the frequency and voltage so that the processor "sprints" for a short time to accomplish the desired operations. This has the effect of allowing a processor which nominally runs at a lower frequency to attain operational rates reached by more powerful processors during those times when such rates are advantageous.

Although the present invention has been described in terms of a preferred embodiment, it will be appreciated that various modifications and alterations might be made by those skilled in the art without departing from the spirit and scope of the invention. The invention should therefore be measured in terms of the claims which follow.

What is claimed is:

1. A method for controlling power consumption of a computer processor on a chip comprising the steps of:
   determining a maximum allowable power consumption level from an operating condition of the processor,
   said computer processor determining a maximum frequency which provides power not greater than the allowable power consumption level,
   said computer processor determining a minimum voltage which allows operation at the maximum frequency determined, and
   dynamically changing the power consumption of the processor by changing frequency and voltage, respectively, to the maximum frequency and the minimum voltage determined, wherein said dynamically changing the power consumption comprises executing instructions in said computer processor while changing voltage at which said computer processor is operated.

2. The method of claim 1, wherein said dynamically changing the power consumption comprises increasing voltage prior to increasing frequency.

3. The method of claim 1, wherein said dynamically changing the power consumption comprises lowering frequency prior to lowering voltage.

4. The method of claim 3, wherein dynamically changing the power consumption further comprises:
   executing instructions in said computer processor while lowering voltage at which said computer processor is operated.

5. The method of claim 1, wherein said dynamically changing the power consumption comprises:
   executing said instructions in said computer processor while lowering voltage at which said computer processor is operated.

6. The method of claim 1, wherein said dynamically changing the power consumption comprises concurrently generating a plurality of frequencies.

7. The method of claim 1, wherein said operating condition of the processor is internal to the processor.

8. A computing device comprising:
   a power supply furnishing selectable output voltages,
   a clock frequency source,
   a central processor including:
      a processing unit for providing values indicative of operating conditions of the central processor, and
      a clock frequency generator receiving a clock frequency from the clock frequency source and providing one of a plurality of selectable output clock frequencies to the processing unit;
   means for detecting the values indicative of operating conditions of the central processor and causing the power supply and clock frequency generator to furnish an output clock frequency and voltage level for the central processor and to generate concurrently frequencies which are selected for optimum operation of a plurality of functional units of the computing device; and
   means for executing instructions in said central processor while changing voltage at which said central processor is operated.

9. A computing device as claimed in claim 8 in which the means for detecting the values indicative of operating conditions of the central processor comprises control software for determining an output clock frequency and voltage level for the central processor adapted to conserve power while maintaining an effective execution rate.

10. A method for controlling the power used by a computer comprising the steps of:
utilizing control software dedicated to a central processor to measure the operating characteristics of the central processor of the computer,
determining when the operating characteristics of the central processor are significantly different than required by the operations being conducted, and
changing the operating characteristics of the central processor to a level commensurate with the operations being conducted in which:
the step of determining when the operating characteristics of the central processor are significantly different than required by the operations being conducted comprising utilizing the control software to determine desirable voltages and frequencies for the operation of the central processor based on the measured operating characteristics, and
the step of changing the operating characteristics of the central processor to a level commensurate with the operations being conducted comprises:
providing signals:
for controlling voltages furnished by a programmable power supply to the central processor,
for controlling frequencies furnished by the central processor to the central processor, and
providing signals for controlling frequencies furnished by the central processor to other functional units of the computer; and
executing instructions in said central processor while changing voltage at which said central processor is operated.

11. A computer comprising:
a power supply furnishing selectable output voltages,
a clock frequency source,
a bus,
system memory,
a central processor including:
a processing unit for providing values indicative of operating conditions of the central processor, and
a clock frequency generator receiving a clock frequency from the clock frequency source and providing a plurality of selectable output clock frequencies to the processing unit; and
means for detecting the values indicative of operating conditions of the central processor and causing the power supply and clock frequency generator to furnish an output clock frequency and voltage level for the central processor and to generate concurrently frequencies which are selected for optimum operation of a plurality of functional units of the computing device including system memory, wherein the means for detecting the values indicative of operating conditions of the central processor is further for causing execution of instructions in said central processor while changing voltage at which said central processor is operated.

12. A computer as claimed in claim 11 in which the means for detecting the values indicative of operating conditions of the central processor comprises control software for determining an output clock frequency and voltage level for the central processor adapted to conserve power while maintaining an effective execution rate.

13. A computing device as claimed in claim 11 in which the means for detecting the values indicative of operating conditions of the central processor causes the clock frequency generator to generate frequencies with are selected for optimum operation of system memory.

14. A computing device as claimed in claim 11 in which the means for detecting the values indicative of operating conditions of the central processor causes the clock frequency generator to generate frequencies which are selected for optimum operation of the bus.

15. A method of controlling a computer processor, comprising:
monitoring operating conditions internal to said computer processor;
determining a frequency and a voltage at which to operate said computer processor, based on said internal operating conditions; and
implementing the determined frequency and voltage, wherein said implementing comprises:
executing instructions in said computer processor while changing voltage at which said computer processor is operated.

16. The method of claim 15 wherein said monitoring comprises said computer processor monitoring operating conditions internal to said computer processor.

17. The method of claim 15, wherein said implementing comprises lowering frequency at which said computer processor is operated.

18. The method of claim 17, wherein said changing voltage comprises lowering voltage at which said computer processor is operated.

19. The method of claim 18, wherein said lowering voltage occurs after said lowering frequency.

20. The method of claim 15, wherein said implementing comprises:
increasing frequency at which said computer processor is operated.

21. The method of claim 20, wherein said changing voltage comprises increasing voltage at which said computer processor is operated.

22. The method of claim 21, wherein said increasing voltage occurs prior to said increasing frequency.

23. A method of controlling a computer processor, comprising:
monitoring idle time of said computer processor;
said computer processor determining a frequency and a voltage at which to operate said computer processor, based on said idle time; and
implementing the determined frequency and voltage, wherein said implementing comprises executing instructions in said computer processor while changing voltage at which said computer processor is operated.

24. The method of claim 23, wherein said implementing comprises:
lowering frequency at which said computer processor is operated prior to lowering voltage at which said computer processor is operated.

25. The method of claim 24, wherein said implementing further comprises:
increasing voltage at which said computer processor is operated prior to increasing frequency at which said computer processor is operated.

26. The method of claim 24, wherein said implementing further comprises:
executing instructions in said computer processor while lowering voltage at which said computer processor is operated.

27. The method of claim 23, wherein said implementing comprises:
increasing voltage at which said computer processor is operated prior to increasing frequency at which said computer processor is operated.

28. The method of claim 23, wherein said monitoring idle time comprises monitoring internal data of said computer processor.

29. The method of claim 23, wherein said implementing comprises:
executing instructions in said computer processor while lowering voltage at which said computer processor is operated.

30. A method of controlling a computer processor, comprising:
monitoring a state of said computer processor;
said computer processor determining a frequency and a voltage at which to operate said computer processor, based on said state; and
implementing the determined frequency and voltage, wherein said implementing comprises executing instructions in said computer processor while changing voltage at which said computer processor is operated.

31. The method of claim 30, wherein said state comprises a sleep state.

32. The method of claim 31, wherein said monitoring further comprises monitoring a halt state of said computer processor.

33. The method of claim 30, wherein said state comprises a halt state.

34. The method of claim 30, wherein said implementing comprises:
lowering frequency at which said computer processor is operated prior to lowering voltage at which said computer processor is operated.

35. The method of claim 34, wherein said implementing further comprises:
increasing voltage at which said computer processor is operated prior to increasing frequency at which said computer processor is operated.

36. The method of claim 34, wherein said implementing further comprises:
executing instructions in said computer processor while lowering voltage at which said computer processor is operated.

37. The method of claim 30, wherein said implementing comprises:
increasing voltage at which said computer processor is operated prior to increasing frequency at which said computer processor is operated.

38. The method of claim 30, wherein said implementing comprises:
executing instructions in said computer processor while lowering voltage at which said computer processor is operated.

39. A method of managing power consumption comprising:
monitoring internal conditions of a computer processor;
based on said internal conditions, determining an allowable power consumption level;
a computer processor determining a voltage-frequency pair for said allowable power consumption level; and
dynamically changing power consumption of the computer processor by implementing said voltage-frequency pair, wherein said dynamically changing power consumption comprises changing voltage at which said computer processor is operated while executing instructions in said computer processor.

40. The method of claim 39, wherein said dynamically changing power consumption comprises:
lowering frequency at which said computer processor is operated prior to lowering voltage at which said computer processor is operated.

41. The method of claim 40, wherein said dynamically changing power consumption further comprises:
increasing voltage at which said computer processor is operated prior to increasing frequency at which said computer processor is operated.

42. The method of claim 40, wherein said implementing further comprises:
executing instructions in said computer processor while lowering voltage at which said computer processor is operated.

43. The method of claim 39, wherein said dynamically changing power consumption comprises:
increasing voltage at which said computer processor is operated prior to increasing frequency at which said computer processor is operated.

44. The method of claim 39, wherein said monitoring comprises monitoring a state of said computer processor.

45. The method of claim 44, wherein said state comprises a halt state.

46. The method of claim 44, wherein said state comprises a sleep state.

47. The method of claim 46, wherein said monitoring further comprises monitoring a halt state of said computer processor.

48. The method of claim 39, wherein said monitoring comprises monitoring a temperature.

49. The method of claim 48, wherein said monitoring further comprises monitoring a state of said computer processor.

50. The method of claim 49, wherein said state comprises a halt state.

51. The method of claim 49, wherein said state comprises a sleep state.

52. The method of claim 51, wherein said monitoring further comprises monitoring a halt state of said computer processor.

53. The method of claim 48, wherein said dynamically changing the power consumption comprises lowering frequency prior to lowering voltage.

54. The method of claim 39, wherein said determining a voltage-frequency pair comprises accessing a table of predetermined voltage-frequency pairs.

55. The method of claim 39, wherein said determining a voltage-frequency pair comprises calculating a voltage-frequency pair.

56. A computing device comprising:
a power supply furnishing selectable output voltages;
a clock frequency source; and
a central processor comprising:
a clock frequency generator receiving a clock frequency from the clock frequency source; and
a processing unit operable to provide values indicative of operating conditions of the central processor and to cause the power supply and the clock frequency generator to furnish a voltage level and an output clock frequency for the central processor, wherein said processing unit is further operable to cause the power supply to cause voltage furnished to the central processor to change while the central processor is executing instructions.

57. The computing device of claim 56, wherein:
said clock frequency generator is operable to provide one of a plurality of selectable output clock frequencies to the processing unit.
58. The computing device of claim 57, wherein:
said clock frequency generator is further operable to concurrently generate frequencies for a plurality of functional units of the computing device.

59. The computing device of claim 56, wherein:
said clock frequency generator is operable to concurrently generate frequencies for a plurality of functional units of the computing device.

\* \* \* \* \*

INTER PARTES REEXAMINATION CERTIFICATE (0088th)
United States Patent
Halepete et al.

(10) Number: US 7,100,061 C1
(45) Certificate Issued: Aug. 4, 2009

(54) ADAPTIVE POWER CONTROL

(75) Inventors: Sameer Halepete, San Jose, CA (US); H. Peter Anvin, San Jose, CA (US); Zongjian Chen, Palo Alto, CA (US); Godfrey P. D'Souza, San Jose, CA (US); Marc Fleischmann, Menlo Park, CA (US); Keith Klayman, Sunnyvale, CA (US); Thomas Lawrence, Mountain View, CA (US); Andrew Read, Sunnyvale, CA (US)

(73) Assignee: Transmeta Corporation, Santa Clara, CA (US)

Reexamination Request:
No. 95/000,243, Jun. 13, 2007

Reexamination Certificate for:
Patent No.: 7,100,061
Issued: Aug. 29, 2006
Appl. No.: 09/484,516
Filed: Jan. 18, 2000

(51) Int. Cl.
*G06F 1/30* (2006.01)

(52) U.S. Cl. .................................... 713/322
(58) Field of Classification Search .............. None
See application file for complete search history.

(56) References Cited

U.S. PATENT DOCUMENTS

| | | |
|---|---|---|
| 4,137,563 A | 1/1979 | Tsunoda |
| 4,238,784 A | 12/1980 | Keen |
| 4,694,393 A | 9/1987 | Hirano |
| 4,698,748 A | 10/1987 | Juzswik |
| 4,841,440 A | 6/1989 | Yonezu |
| 4,893,271 A | 1/1990 | Davis |
| 5,021,679 A | 6/1991 | Fairbanks |
| 5,025,387 A | 6/1991 | Frane |
| 5,086,387 A | 2/1992 | Arroyo |
| 5,153,535 A | 10/1992 | Fairbanks et al. |
| 5,189,314 A | 2/1993 | Georgiou et al. |
| 5,220,672 A | 6/1993 | Nakao |
| 5,274,798 A | 12/1993 | Aihara |
| 5,388,265 A | 2/1995 | Volk |
| 5,390,350 A | 2/1995 | Chung |

(Continued)

FOREIGN PATENT DOCUMENTS

| | | |
|---|---|---|
| EP | 0568237 A | 11/1993 |
| EP | 0632360 A1 | 1/1995 |
| EP | 0699992 | 3/1996 |
| EP | 0978781 | 2/2000 |
| JP | 63-180118 | 7/1988 |

(Continued)

OTHER PUBLICATIONS

Hong, I. et al., *Synthesis techniques for low–power hard real–time systems on variable voltage processors,* Real–Time Systems Symposium Proceedings, Dec. 1998 ("Hong–I").

Hong, I. et al., *Power optimization of variable voltage core–based systems,* Design Automation Conference Proceedings, Jun. 1998 ("Hong–II").

Govil, K. et al., *Comparing algorithm for dynamic speed–setting of a low–power CPU,* Proceedings Of The 1st Annual International Conference On Mobile Computing And Networking, pp. 13–25, Nov. 15, 1995 ("Govil").

(Continued)

*Primary Examiner*—Ovidio Escalante

(57) ABSTRACT

A method for controlling the power used by a computer including the steps of measuring the operating characteristics of a central processor of the computer, determining when the operating characteristics of the central processor are significantly different than required by the operations being conducted, and changing the operating characteristics of the central processor to a level commensurate with the operations being conducted.

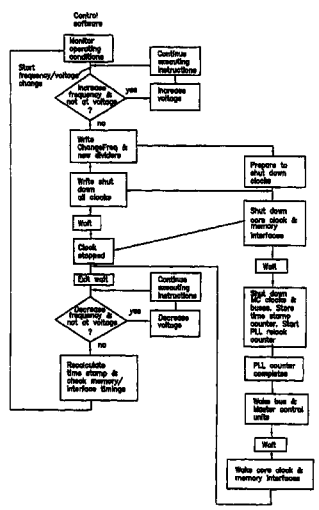

U.S. PATENT DOCUMENTS

| | | | |
|---|---|---|---|
| 5,406,212 | A | 4/1995 | Hashinaga |
| 5,410,711 | A | 4/1995 | Stewart |
| 5,423,045 | A | 6/1995 | Kannan |
| 5,428,790 | A | 6/1995 | Harper |
| 5,440,520 | A | 8/1995 | Schultz |
| 5,452,434 | A | 9/1995 | MacDonald |
| 5,461,652 | A | 10/1995 | Hongo |
| 5,479,648 | A | 12/1995 | Barbera |
| 5,481,697 | A | 1/1996 | Mathews |
| 5,490,059 | A | 2/1996 | Mahalingaiah et al. |
| 5,504,910 | A | 4/1996 | Wisor |
| 5,553,236 | A | 9/1996 | Revilla |
| 5,555,225 | A | 9/1996 | Hayashi |
| 5,560,024 | A | 9/1996 | Harper |
| 5,590,342 | A | 12/1996 | Marisetty |
| 5,600,839 | A | 2/1997 | MacDonald |
| 5,623,677 | A | 4/1997 | Townsley |
| 5,628,020 | A | 5/1997 | O'Brien |
| 5,630,146 | A | 5/1997 | Conary |
| 5,638,083 | A | 6/1997 | Margeson |
| 5,659,789 | A | 8/1997 | Hausauer |
| 5,675,808 | A | 10/1997 | Gulick |
| 5,677,849 | A | 10/1997 | Smith |
| 5,692,201 | A | 11/1997 | Yato |
| 5,710,911 | A | 1/1998 | Walsh |
| 5,710,929 | A | 1/1998 | Fung |
| 5,715,467 | A | 2/1998 | Jirgal |
| 5,721,837 | A | 2/1998 | Kikinis |
| 5,727,208 | A | 3/1998 | Brown |
| 5,734,877 | A | 3/1998 | Ries |
| 5,737,613 | A | 4/1998 | Mensch |
| 5,745,375 | A | 4/1998 | Reinhardt et al. |
| 5,745,774 | A | 4/1998 | Munetsugu |
| 5,754,436 | A | 5/1998 | Walsh |
| 5,754,833 | A | 5/1998 | Singh et al. |
| 5,754,837 | A | 5/1998 | Walsh |
| 5,754,867 | A | 5/1998 | Walker |
| 5,754,883 | A | 5/1998 | Lim |
| 5,760,636 | A | 6/1998 | Noble et al. |
| 5,774,703 | A | 6/1998 | Weiss et al. |
| 5,781,060 | A | 7/1998 | Sugawara |
| 5,781,780 | A | 7/1998 | Walsh |
| 5,787,294 | A | 7/1998 | Evoy |
| 5,794,022 | A | 8/1998 | Karouji |
| 5,798,667 | A | 8/1998 | Herbert |
| 5,799,198 | A | 8/1998 | Fung |
| 5,805,909 | A | 9/1998 | Diewald |
| 5,812,860 | A | 9/1998 | Horden et al. |
| 5,815,725 | A | 9/1998 | Feierbach |
| 5,825,674 | A | 10/1998 | Jackson |
| 5,832,205 | A | 11/1998 | Kelly |
| 5,832,284 | A | 11/1998 | Michail et al. |
| 5,842,029 | A | 11/1998 | Conary |
| 5,884,068 | A | 3/1999 | Conary et al. |
| 5,892,959 | A | 4/1999 | Fung |
| 5,898,879 | A | 4/1999 | Kim |
| 5,905,914 | A | 5/1999 | Sakai |
| 5,907,699 | A | 5/1999 | Nakajima |
| 5,909,585 | A | 6/1999 | Shinmiya |
| 5,913,067 | A | 6/1999 | Klein |
| 5,926,394 | A | 7/1999 | Nguyen et al. |
| 5,931,951 | A | 8/1999 | Ando |
| 5,935,253 | A | 8/1999 | Conary |
| 5,974,557 | A | 10/1999 | Thomas et al. |
| 5,978,864 | A | 11/1999 | Hetherington |
| 6,000,035 | A | 12/1999 | Matsushima |
| 6,006,169 | A | 12/1999 | Sandhu |
| 6,016,548 | A | 1/2000 | Nakamura |
| 6,035,407 | A | 3/2000 | Gebara |
| 6,048,746 | A | 4/2000 | Burr |
| 6,087,892 | A | 7/2000 | Burr |
| 6,091,283 | A | 7/2000 | Murgula |
| 6,100,751 | A | 8/2000 | De |
| 6,141,762 | A | 10/2000 | Nicol et al. |
| 6,158,012 | A | 12/2000 | Watts, Jr. |
| 6,163,583 | A | 12/2000 | Lin et al. |
| 6,192,479 | B1 | 2/2001 | Ko |
| 6,216,234 | B1 | 4/2001 | Sager et al. |
| 6,218,708 | B1 | 4/2001 | Burr |
| 6,303,444 | B1 | 10/2001 | Burr |
| 6,311,281 | B1 | 10/2001 | Pole et al. |
| 6,311,287 | B1 | 10/2001 | Dischler et al. |
| 6,320,453 | B1 | 11/2001 | Manning |
| 6,345,362 | B1 | 2/2002 | Bertin |
| 6,363,490 | B1 | 3/2002 | Senyk |
| 6,425,086 | B1 | 7/2002 | Clark et al. |
| 6,477,657 | B1 | 11/2002 | Kurd et al. |
| 6,484,041 | B1 | 11/2002 | Aho et al. |
| 6,487,668 | B2 | 11/2002 | Thomas et al. |
| 6,489,224 | B1 | 12/2002 | Burr |
| 6,574,577 | B2 | 6/2003 | Stapleton |
| 6,647,502 | B1 | 11/2003 | Ohmori |
| 6,675,360 | B1 | 1/2004 | Cantone |
| 6,731,221 | B1 | 5/2004 | Dioshongh |
| 6,792,379 | B2 | 9/2004 | Ando |
| 6,928,559 | B1 | 8/2005 | Beard |
| 2002/0087219 | A1 | 7/2002 | Dai |
| 2002/0087896 | A1 | 7/2002 | Cline |
| 2002/0116650 | A1 | 8/2002 | Halepete |
| 2002/0194509 | A1 | 12/2002 | Plante |
| 2003/0036876 | A1 | 2/2003 | Fuller |
| 2004/0025061 | A1 | 2/2004 | Lawrence |
| 2004/0073821 | A1 | 4/2004 | Naveh |
| 2004/0103330 | A1 | 5/2004 | Bonnett |

FOREIGN PATENT DOCUMENTS

| | | |
|---|---|---|
| JP | 64-023317 | 1/1989 |
| JP | 64-59518 | 3/1989 |
| JP | 02-083720 | 3/1990 |
| JP | 02-105213 | 4/1990 |
| JP | 2183321 | 7/1990 |
| JP | 4139512 | 5/1992 |
| JP | 5224773 | 9/1993 |
| JP | 6102959 | 4/1994 |
| JP | 10-187300 | 7/1998 |
| WO | WO93/06545 A1 | 4/1993 |
| WO | WO98/06022 | 2/1998 |

OTHER PUBLICATIONS

Baker K, "SHMOO Plotting: The Black Art of IC Testing" IEEE Design & Test of Computer, IEEE vol. 14, No. 3, Jul. 1, 1997, pp. 90–97, XP000793305 I SSN: 070–7475 the whole document.

"Computer software", Wikipedia, http://en.wikipedia.org/wiki/Software, retrieved on May 2, 2007.

"Wafer Burn–In Isolation Circuit" IBM Technical Disclosure Bulletin, IBM Corp. New York, US, vol. 32, No. 6B, Nov. 1, 1989, pp. 442–443, XP00073858 ISSN: 0018–8689 the whole document.

Weiser, "Scheduling for Reduced CPU Energy"; Xerox PARC; Palo Alto, CA; Appears in "Proceedings of the First Symposium on Operating Systems Design and Implementation" Usenix Association; Nov. 1994.

Weiser, Some Computer Science Issues in Ubiquitous Computing; Jul. 1993; Communications of the ACM, vol. 36, pp. 75–84.

Leibson, Xscale (Strongarm–2) Muscles In; Sep. 11, 2000; Microdesign Resources, Microprocessor Report.

Stratakos, "High–Efficiency Low–Voltage DC–DC Conversion For Portable Applications,"Fall 1998, Univ. of Cal., Berkeley, Ph.D. Dissertation.

Pering, "The Simulation and Evaluation of Dynamic Voltage Scaling Algorithms," International Symposium on Low Power Electronics and Design, Aug. 1998, pp. 76–81, Monterey, California.

Pering, "Dynamic Voltage Scaling and the Design of a Low–Power Microprocessor System," *Proceedings of the Power Driven Microarchitecture Workshop, In Conjunction With International Symposium On Computer Architecture,* Jun. 1998.

Thomas D. Burd, Trevor Pering, Anthony Stratakos, and Robert W. Brodensen, "A Dynamic Voltage Scaled Microprocessor System" Berkeley Wireless Research Center, University of California Berkeley. ISSCC 2000–Paper 17.4. 2000 IEEE. 22 Pages.

Office Action dated Nov. 21, 2007 in U.S. Appl. No. 11/411,309, filed Oct. 31, 2007.

Cao et al, "Transient Thermal Management in Electronic Packaging Using Dynamic Control of Power Dissipation and Heat Transfer", IEEE Elect. Components & Tech. Conference (1996), pp. 205–211.

G2 Computer Intelligence, "Bad Chips Cause Transmeta Recall (defective CPUs in Japanese notebook computers from NEC) (Product Information)", Client Server News, (Dec. 14, 2000).

Krazit, Tom, "Transmeta Hype Suffers Hardware Reality", PC World (Sep. 6, 2004).

Mainelli, Tom, "Where's Transmeta?", PCWorld.com (Oct. 12, 2001).

Witheiler, Matthew, "Intel Centrino/Pentium–M Notebook Roundup: Dell, FIC and IBM Examined", www.anandtech.com (Mar. 12, 2003).

Pollack; New Microarchitecture Challenges in the Coming Generations of CMOS Process Technologies; 32nd Annual Symposium on Microarchitecture, Nov. 16–18, 1999; Haifa, Israel (includes Abstract, Speaker's Biography, and Presentation).

Burd, et al.; Processor Design For Portable Systems; 1996; Dept. of EECS, Univ. of California at Berkeley.

Chandrakasan, et al.; Low–Power CMOS Digital Design; IEEE Journal of Solid–State Circuits; Apr. 1992; pp. 473–484; vol. 27, No. 4.

INTER PARTES REEXAMINATION CERTIFICATE ISSUED UNDER 35 U.S.C. 316

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 8, 9 and 11–14 is confirmed.

Claims 2, 16, 20–22, 25, 27, 35, 37, 41 and 43 are cancelled.

Claims 1, 7, 10, 15, 23, 28, 30–31, 33, 39, 44–46, 49–51 and 56 are determined to be patentable as amended.

Claims 3–6, 17–19, 24, 26, 29, 32, 34, 36, 38, 40, 42, 47, 48, 52–55 and 57–59, dependent on an amended claim, are determined to be patentable.

New claims 60–68 are added and determined to be patentable.

1. A method for controlling power consumption of a computer processor on a chip comprising the steps of:
  determining a *reduced* maximum allowable power consumption level from [an operating condition] *operating conditions* of the processor, *said determination made independently of instructions to be executed by the processor*,
  said computer processor determining a maximum frequency which provides power not greater than the allowable power consumption level,
  said computer processor determining a minimum voltage which allows operation at the maximum frequency determined, and
  *said computer processor* dynamically changing [the] *its* power consumption [of the processor] by changing *its* frequency and *causing a change in its* voltage, respectively, to the maximum frequency and the minimum voltage determined, wherein said dynamically changing the power consumption comprises executing instructions in said computer processor while changing voltage at which said computer processor is operated.

7. The method of claim 1, wherein said operating [condition] *conditions* of the processor [is] *are* internal to the processor.

10. A method for controlling the power used by a computer comprising the steps of:
  utilizing control software dedicated to a central processor to measure the operating characteristics of the central processor of the computer,
  determining when the operating characteristics of the central processor are significantly different than required by the operations being conducted, and
  changing the operating characteristics of the central processor to a level commensurate with the operations being conducted in which:
  the step of determining when the operating characteristics of the central processor are significantly different than required by the operations being conducted comprising utilizing the control software to determine desirable *reduced* voltages and frequencies for the operation of the central processor based on the measured operating characteristics, *said determining step made independently of instructions to be executed by the central processor*, and
  the step of changing the operating characteristics of the central processor to a level commensurate with the operations being conducted comprises:
  providing signals:
    for controlling voltages furnished by a programmable power supply to the central processor,
    for controlling frequencies furnished by the central processor to the central processor, and
    providing signals for controlling frequencies by the central processor to other functional units of the computer; and
  executing instructions in said central processor while changing voltage at which said central processor is operated.

15. A method of controlling a computer processor, comprising:
  monitoring operating conditions internal to said computer processor;
  *said computer processor* determining a *reduced* frequency and a voltage at which to operate said computer processor, based on said internal operating conditions, *said determination made independently of instructions to be executed by the processor*; [and]
  *said computer processor* implementing the determined frequency and voltage, wherein said implementing comprises:
  *changing its frequency;*
  *causing the voltage at which said computer processor is operated to change;*
  executing instructions in said computer processor [while changing voltage at which said computer processor is operated] *during said voltage change; and*
  *wherein said monitoring comprises said computer processor monitoring said operating conditions internal to said computer processor.*

23. A method of controlling a computer processor, comprising:
  monitoring idle time of said computer processor;
  said computer processor determining a *reduced* frequency and a voltage at which to operate said computer processor, based on said idle time, *said determination made independently of instructions to be executed by the processor*; and
  said computer processor implementing the determined frequency and voltage, wherein said implementing comprises *changing its frequency, causing the voltage at which said computer processor is operated to change, and* executing instructions in said computer processor [while changing voltage at which said computer processor is operated] *during said voltage change.*

28. The method of claim 23, wherein said monitoring idle time comprises monitoring internal data of said computer processor *relating to the amount of time spent in a plurality of idle states*.

30. A method of controlling a computer processor, comprising:
  monitoring [a state] *the amount of time spent in a plurality of idle states* of said computer processor;
  said computer processor determining a frequency and a voltage at which to operate said computer processor, based on said [state] *idle states*; and

*said computer processor* implementing the determined frequency and voltage, wherein said implementing comprises *changing its frequency, causing the voltage at which said computer processor is operated to change, and* executing instructions in said computer processor [while changing voltage at which said computer processor is operated] *during said voltage change.*

31. The method of claim 30, wherein said [state comprises] *idle states include* a sleep state.

33. The method of claim 30, wherein said [state comprises] *idle states include* a halt state.

39. A method of managing power consumption comprising:

monitoring internal conditions of a computer processor;

based on said internal conditions, determining an allowable *reduced* power consumption level, *said determination made independently of instructions to be executed by the processor*;

a computer processor determining a voltage-frequency pair for said allowable power consumption level; and

*said computer processor* dynamically changing *its* power consumption [of the computer processor] by implementing said voltage-frequency pair, wherein said dynamically changing power consumption comprises changing *its frequency, causing a change in the* voltage at which said computer processor is operated [while executing instructions in said computer processor], *and executing instructions in said computer processor during said change in voltage.*

44. The method of claim 39, wherein said monitoring comprises monitoring [a state] *idle states* of said computer processor.

45. The method of claim 44, wherein said [state comprises] *idle states include* a halt state.

46. The method of claim 44, wherein said [state comprises] *idle states include* a sleep state.

49. The method of claim 48, wherein said monitoring further comprises monitoring [a state] *idle states* of said computer processor.

50. The method of claim 49, wherein said [state comprises] *idle states include* a halt state.

51. The method of claim 49, wherein said [state comprises] *idle states include* a sleep state.

56. A computing device comprising:

a power supply furnishing selectable output voltages;

a clock frequency source; and a central processor comprising:

a clock frequency generator receiving a clock frequency from the clock frequency source; and a processing unit operable to provide values indicative of operating conditions of the central processor and to cause the power supply and the clock frequency generator to furnish a voltage level and an output clock frequency for the central processor, wherein said processing unit is further operable to cause the power supply to cause voltage furnished to the central processor to change while the central processor is executing instructions, and wherein the central processor determines *a reduced* voltage level and output clock frequency based on the operating conditions, *said determination made independently of instructions to be executed by the processor.*

60. The method of claim 6, wherein said computer processor determines a core clock frequency and a plurality of different values by which to divide said core clock frequency.

61. The method of claim 15, wherein said implementing comprises the computer processor changing at least one frequency so as to vary a ratio between operating frequencies for different components of a computer system.

62. The method of claim 61, wherein said operating frequencies for different components of the system are individually controlled.

63. The method of claim 30, wherein said implementing comprises the computer processor changing at least one frequency so as to vary a ratio between operating frequencies for different components of a computer system.

64. The method of claim 63, wherein said operating frequencies for different components of the system are individually controlled.

65. The method of claim 39, wherein said computer processor implements a voltage-frequency pair that varies a ratio between operating frequencies of different components of a computer system.

66. The method of claim 65, wherein said operating frequencies for different components of the system are individually controlled.

67. The method of claim 15, wherein said operating conditions include temperature of operation of the computer processor; and wherein the method comprises determining a frequency and voltage in excess of a normal frequency and voltage for said computer processor if said temperature of operation compares in a predetermined manner to a preselected value; and changing frequency and voltage of operation of the computer processor from said normal frequency and voltage to said determined higher frequency and voltage for a period of time.

68. The method of claim 67, wherein said period of time is a value computed by said computer processor.

\* \* \* \* \*